(12) United States Patent
Frosio et al.

(10) Patent No.: US 10,192,525 B2
(45) Date of Patent: Jan. 29, 2019

(54) SYSTEM, METHOD AND COMPUTER PROGRAM PRODUCT FOR GENERATING ONE OR MORE VALUES FOR A SIGNAL PATCH USING NEIGHBORING PATCHES COLLECTED BASED ON A DISTANCE DYNAMICALLY COMPUTED FROM A NOISE DISTRIBUTION OF THE SIGNAL PATCH

(71) Applicant: NVIDIA Corporation, Santa Clara, CA (US)

(72) Inventors: Iuri Frosio, San Jose, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 3 days.

(21) Appl. No.: 15/421,364

(22) Filed: Jan. 31, 2017

(65) Prior Publication Data

US 2017/0263041 A1     Sep. 14, 2017

Related U.S. Application Data

(60) Provisional application No. 62/307,321, filed on Mar. 11, 2016.

(51) Int. Cl.
  *G06T 5/00* (2006.01)
  *G09G 5/36* (2006.01)

(52) U.S. Cl.
  CPC ............ *G09G 5/363* (2013.01); *G06T 5/002* (2013.01)

(58) Field of Classification Search
  CPC .......................................... G06T 5/001–5/005
  See application file for complete search history.

(56) References Cited

PUBLICATIONS

Brox, Thomas, Oliver Kleinschmidt, and Daniel Cremers. "Efficient nonlocal means for denoising of textural patterns." IEEE Transactions on Image Processing 17.7 (2008): 1083-1092.*
Kervrann, Charles, and Jérôme Boulanger. "Optimal spatial adaptation for patch-based image denoising." IEEE Transactions on Image Processing 15.10 (2006): 2866-2878.*
Patidar, Pawan, et al. "Image de-noising by various filters for different noise." International journal of computer applications 9.4 (2010).*
Rajwade, Ajit, Anand Rangarajan, and Arunava Banerjee. "Image denoising using the higher order singular value decomposition." IEEE Transactions on Pattern Analysis and Machine Intelligence 35.4 (2013): 849-862.*
Szlam, Arthur. "Non-local means for audio denoising." CAM report (2008): 08-56.*

(Continued)

*Primary Examiner* — Ryan McCulley
(74) *Attorney, Agent, or Firm* — Zilka-Kotab, P.C.

(57) ABSTRACT

A system, method and computer program product are provided for generating one or more values for a signal patch using neighboring patches collected based on a distance dynamically computed from a noise distribution of the signal patch. In use, a reference patch is identified from a signal, and a reference distance is computed based on a noise distribution in the reference patch. Neighbor patches are then collected from the signal based on the computed reference distance from the reference patch. Further, the collected neighbor patches are processed with the reference patch to generate one or more values for the reference patch.

22 Claims, 11 Drawing Sheets

(56) References Cited

PUBLICATIONS

Buades et al., "A Review of Image Denoising Algorithms, With a New One," SIAM Journal on Multiscale Modeling and Simulation: A SIAM Interdisciplinary Journal, vol. 4, No. 2, 2005, pp. 1-42.
Dabov et al., "BM3D Image Denoising with Shape-Adaptive Principal Component Analysis," SPARS, 2009, pp. 1-6.
Dabov et al., "Image denoising by sparse 3D transform-domain collaborative filtering," IEEE Transactions on Image Processing, vol. 16, No. 8, Aug. 2007, pp. 1-16.
Danielyan et al., "Cross-Color BM3D Filtering of Noisy Rawdata," IEEE, 2009, pp. 1-5.
Duval et al., "On the Parameter Choice for the Non-Local Means," SIAM Journal on Imaging Sciences, 2011, pp. 1-37.
Foi, A., "Clipped noisy images: Heteroskedastic modeling and practical denoising," Signal Processing, Jun. 2, 2009, pp. 1-20.
Hastie, et al., "The Elements of Statistical Learning, Data Mining, Inference, and Prediction" 2nd Edition, Springer Series in Statistics, 2009, 764 pages.
Kiku et al., "Residual Interpolation for Color Image Demosaicking," 20th IEEE International Conference on Image processing, Sep. 2013, pp. 2304-2308.
Knaus et al., "Progressive Image Denoising," IEEE Transactions on Image Processing, 2014, pp. 1-12.
Lebrun et al., "Secrets of image denoising cuisine," Acta Numerica, 2012, pp. 1-102.
Lou et al., "Nonlocal Similarity Image Filtering," 2009, pp. 1-10.
Malvar et al., "High-quality linear interpolation for demosaicing of bayer-patterned color images," International Conference of Acoustic, Speech and Signal Processing, May 2004, pp. 1-4.
Ponomarenko et al., "Image database TID2013: Peculiarities, result and perspectives," Signal Processing: Image Communication, vol. 30, 2015, pp. 57-77.
Tomasi et al., "Bilateral Filtering for Gray and Color Images," Proceedings of the 1998 IEEE International Conference on Computer Vision, 1998, pp. 1-8.
Tsai et al., "Fast ANN for High-Quality Collaborative Filtering," High Performance Graphics, 2014, pp. 1-10.
Wang et al., "Image Quality Assessment: From Error Visibility to Structural Similarity," IEEE Transactions on Image Processing, vol. 13, No. 4, Apr. 2004, pp. 600-612.
Wang et al., "Multi-Scale Structural Similarity for Image Quality Assessment," Proceedings of the 37th IEEE Asilomar Conference on Signals, Systems and Computers, Nov. 2003, pp. 1-5.
Wu et al., "Probabilistic Non-Local Means," IEEE Signal Processing Letters, vol. 20, 2013, pp. 1-4.
Xue et al., "Gradient Magnitude Similarity Deviation: A Highly Efficient Perceptual Image Quality Index," IEEE Transactions on Image Processing, vol. 23, No. 2, Feb. 2014, pp. 684-695.
Yu et al., "DCT Image Denoising: a Simple and Effective Image Denoising Algorithm," Image Processing on Line, vol. 1, Oct. 2011, pp. 292-296.
Zhang et al., "FSIM: A Feature Similarity Index for Image Quality Assessment," IEEE Transactions on Image Processing, 2011, pp. 1-21.
Deledalle et al., "How to compare noisy patches? Patch similarity beyond Gaussian noise," International Journal of Computer Vision, vol. 99, No. 1, Aug. 2012, pp. 1-17.

* cited by examiner

SYSTEM, METHOD AND COMPUTER PROGRAM PRODUCT FOR GENERATING ONE OR MORE VALUES FOR A SIGNAL PATCH USING NEIGHBORING PATCHES COLLECTED BASED ON A DISTANCE DYNAMICALLY COMPUTED FROM A NOISE DISTRIBUTION OF THE SIGNAL PATCH

CLAIM OF PRIORITY

This application claims the benefit of U.S. Provisional Application No. 62/307,321 titled "Nearest Neighbors' Selection Scheme for Denoising," and filed Mar. 11, 2016, the entire contents of which is incorporated herein by reference.

FIELD OF THE INVENTION

The present invention relates to signal processing, and more particularly to computer-implemented signal processing algorithms.

BACKGROUND

Signal processing algorithms are typically executed by a computer system to enhance or otherwise change one or more aspects of a signal. For example, signal processing algorithms can be executed by a processor of a computer to denoise, fill, etc. various portions of the signal. These signal processing algorithms can generally include generating one or more values for a reference patch in the signal using a plurality of collected patches that neighbor that reference patch. However, to date, conventional signal processing algorithms have required a tradeoff between computational intensiveness and reduced signal quality.

In one implementation, the signal may be a digital image, in which case a signal processing algorithm may be employed to enhance or otherwise change one or more aspects of a digital image. For example, a signal processing algorithm operating on the image can be executed by the processor of a computer to denoise, fill, deblur, re-color, etc. portions of the image as desired. The above mentioned tradeoff between computational intensiveness and reduced image quality is still required. It should be noted that the computational intensiveness of the algorithm generally increases with the number of dimensions of the signal, thus finding a compromise is even more important for signals with a high number of dimensions. For example, one class of well known signal processing algorithms, primarily used for denoising purposes, includes non-local algorithms, such as Non-Local Means (NLM), Non-Local-Bayes, block-matching and 3D filtering (BM3D), etc. With respect to non-local algorithms, neighbor patches are collected and processed (e.g. averaged) as mentioned above.

Just by way of example, NLM involves, for each reference patch, processing a high number of other (i.e. neighboring) patches to denoise it. In particular, for each reference patch, a weighted sum of the neighbor patches is used to get an estimate for the denoised reference patch. Because of the high number of patches required, NLM is computationally intensive. The computational burden in some implementations of NLM and other non-local algorithms is reduced by only considering, for the reference patch, a limited number of neighboring patches collected through a nearest neighbor (NN) approach. However, the nearest neighbors to a reference patch may have noise correlated with the noise in the reference patch, as a result of the neighbors collection strategy and/or because of correlations introduced by pre-processing of the signal (e.g., demosacing in a color image). As a consequence, any value generated for the reference patch from those neighbors can still be affected by an undesired level of noise, and the noise in the reference patch will not be cancelled as is otherwise desired. When other applications (i.e. other than denoising) are considered, the presence of correlated noise between the reference and neighbor patches may also lead to the introduction of artifacts. Thus, while using NN in NLM can reduce the computational burden of the traditional implementation of NLM, using NN also reduces the quality of the image. Another well known signal processing algorithm that can similarly use NN includes bilateral filtering, which is a special case of the class of non-local algorithms where a size of each patch is a 1×1 pixel, and the weights in the bilateral filter kernel play the role of the weighting patches in NLM.

Thus, there is a need for addressing these issues and/or other issues associated with the prior art.

SUMMARY

A system, method and computer program product are provided for generating one or more values for a signal patch using neighboring patches collected based on a distance dynamically computed from a noise distribution of the signal patch. In use, a reference patch is identified from a signal, and a reference distance is computed based on a noise distribution in the reference patch. Neighbor patches are then collected from the signal based on the computed reference distance from the reference patch. Further, the collected neighbor patches are processed with the reference patch to generate one or more values for the reference patch.

DETAILED DESCRIPTION

Figure 1:
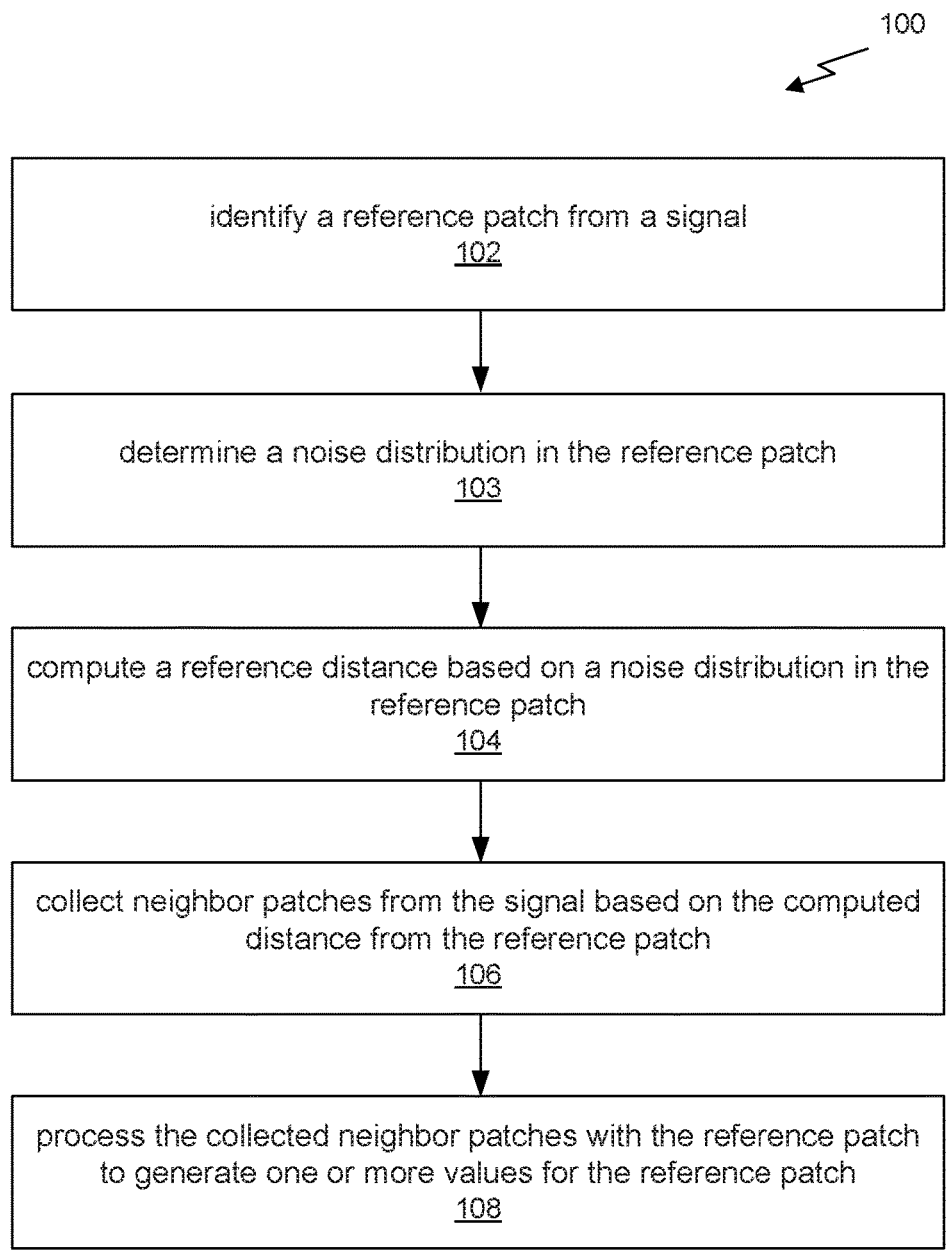
FIG. 1 illustrates a flowchart of a method for generating one or more values for a signal patch using neighboring patches collected based on a distance dynamically computed from a noise distribution of the signal patch, in accordance with one embodiment.

FIG. 1 illustrates a flowchart of a method 100 for generating one or more values for a signal patch using neighboring patches collected based on a distance dynamically computed from a noise distribution of the signal patch, in accordance with one embodiment. The method 100 may be carried out in the context of any of the embodiments described below. For example, the method 100 may be carried out by the parallel processing unit 200 described in FIG. 2.

As shown in operation 102, a reference patch is identified from a signal. In the context of the present description, the signal is any digital signal of N dimensions. For example, the signal may be a 1 dimensional (1D) signal, such as an audio signal, or a biological signal (e.g. a blood pressure signal), etc. In another example, the signal may be a 2 dimensional (2D) signal, such as an image. Of course, 3 dimensional (3D), 4 dimensional (4D) or other multi-dimensional signals are also contemplated (e.g. for 3D and 4D) images, etc.). In the example where the signal is an image, the image may be a digital photograph or a computer-generated graphic.

Accordingly, the reference patch may be any portion, piece, etc. of the N dimensional signal. For example, where the signal is 1D, the reference patch may be a single value of the 1D signal, or a portion of multiple values of the signal. As another example, where the signal is a multi-dimensional signal, the reference patch may be a corresponding multi-dimensional vector. In any case, in the present context the signal is corrupted by noise, including either measurement noise or noise introduced from pre-processing of the signal. Typically, for digital images, photon shot noise with a Poisson distribution is dominant, but also other noise may be present in other types of image (e.g. Gaussian noise in magnetic resonance images).

It should be noted that the reference patch may be identified in various different ways, which may be depend on the application of the present method 100. For example, where the method 100 is performed to denoise the signal (e.g. as in NLM, BM3D, bilateral filtering, etc.), the reference patch may be identified as one in which noise reduction is desired. As another example, where the method 100 is performed to perform patch matching, stereo matching, etc., the reference patch may be identified as one to be filled, matched, re-colored, etc. To this end, the reference patch may be identified automatically based on the application of the present method 100 or may be identified manually through selection by a user. In some implementations, the method 100 may be applied repetitively for every patch in the signal, in which case the reference patch may simply be identified as one patch in a series of patches to which the method 100 is applied. It should be noted that these patches may be overlapping. In the context of this implementation, the method 100 may be applied to a patch in a first position within the signal, and, sequentially or in parallel, the method 100 applied next to a patch in a second position within the signal, and so on. This implementation will be described in further detail below.

In operation 103, a noise distribution in the reference patch is determined. In one embodiment, the noise distribution may be given (e.g., from a noise model describing the data acquisition procedure). In another embodiment, the noise distribution in the reference patch may be estimated. Additionally, as shown in operation 104, a reference distance is computed based on a noise distribution in the reference patch.

As described below in more detail, the distance is computed for use in selecting neighboring patches to the reference patch. In one embodiment, the distance from the reference patch may be greater than zero. In this embodiment, the selected neighboring patches may not be those that are closest to the reference patch, as is otherwise usually the case with NLM and other known filtering algorithms.

In another embodiment, the distance may be computed using a predefined algorithm. The predefined algorithm may output an expected distance from the reference patch where neighbor patches located at, or closest to, that distance have a noise that is substantially orthogonal to the noise in the reference patch. This predefined algorithm may be different for different types of noise (e.g. Gaussian, Poisson, etc.), since noise statistics for a signal may be different for different types of noise. Table 1 illustrates an example of the predefined algorithm that may be used to compute the expected distance from the reference patch, in the case of Gaussian noise with constant variance.

TABLE 1

$2\sigma^2 \cdot k \cdot N$ = expected distance,
where $\sigma^2$ is the variance of zero-mean, white Gaussian noise affecting the signal, and where k is an offset parameter., and
where N is the number of elements in the patch.

In an embodiment, $0<k<=1$. For example, different values of the offset parameter k may be predefined for different applications of the method 100 (e.g. denoising, patch matching, etc.). As another example, a value of the offset parameter k may be based on a noise-to-signal ratio determined for the reference patch. Thus, the offset parameter k may vary across each pixel of the image, and may be adaptively selected based on local properties of the reference patch. Just by way of example, k=1 may generally be used, except for reference patches close to an edge in which case k<1 may be preferred. In another embodiment, k=1 for each execution of the method 100. Optionally, k may be optimized for a signal over time or space or other dimensions of the signal using machine learning applied to different applications of the algorithm.

For a signal that does not involve Gaussian noise, the expected distance may be computed based on noise statistics gathered for the signal, or alternatively a transform that converts the noise to Gaussian noise (or at least noise with constant variance) may be applied to the signal, and then the predefined algorithm for Gaussian noise may be applied to the reference patch to compute the reference distance.

Further, as shown in operation 106, neighbor patches are collected based on the computed reference distance from the reference patch. In the context of the present description, the neighbor patches are of a same form as the reference patch (i.e. single value for a 1D signal or a multi-dimensional vector for a multi-dimensional signal). The neighbor patches may each be collected from the signal described above, but may be collected based on a position determined using another signal. For example, in one embodiment, a position of each of the neighbor patches may be determined from a guidance signal (i.e. preprocessed signal obtained from the original signal), but the neighbor patches may be collected from the original signal. Of course, the position of the neighbor patches may also be determined from the original signal itself.

In one embodiment, operation 106 may involve collecting a predefined number (N) of neighbor patches that are closest to the reference distance from the reference patch. This embodiment may involve ordering all possible neighbor patches to the reference patch (by distance) and then collecting the N neighbor patches that are closest to the reference distance from the reference patch.

In another embodiment, operation 106 may involve determining a range for the reference distance, and then collecting all neighbor patches within that range. In particular, the range may be defined by a minimum distance from the reference patch and a maximum distance from the reference patch, with the reference distance therebetween. Of course, the range may be determined as a function of the computed reference distance. Just by way of example, the range may be defined as that within $2\rho^2 \cdot k+/-1.5*\text{variance}[\text{distance}]$. This embodiment can provide computational efficiency over the above described embodiment where the N neighbor patches that are closest to the reference distance from the reference patch are collected, since this embodiment does not require ordering the neighbor patches.

In any case, as noted above, the distance from the reference patch may be greater than zero such that the collected neighbor patches may not necessarily be those that are closest to the reference patch, as is otherwise the case with the NN approach of the prior art.

Still yet, as shown in operation 108, the collected neighbor patches are processed with the reference patch to generate one or more values for the reference patch. Where the signal is 1D, operation 108 may generate a single value for the reference patch. Where the signal is multi-dimensional, operation 108 may generate one or multiple values a corresponding multi-dimensional vector of values) for the reference patch.

As noted above, the method 100 may be applied for different purposes, such as denoising or patch matching. In one embodiment, processing the collected neighbor patches with the reference patch may include applying NLM to the reference patch using the collected neighbor patches, where the one or more values for the reference patch are generated as a mean of the collected neighbor patches. In another embodiment, processing the collected neighbor patches with the reference patch may include applying bilateral filtering to the reference patch using the collected neighbor patches, where the one or more values for the reference patch are generated as an average of the collected neighbor patches. In yet another embodiment, processing the collected neighbor patches with the reference patch may include applying patch matching to the reference patch using the collected neighbor patches.

In any case, the collected neighbor patches may be processed in accordance with the particular application of the method 100. These applications may be those that are well-known in the art, such as existing NLM and patch matching algorithms as mentioned above, which are improved through the specific use of neighbor patches collected based on the dynamically computed reference distance from the reference patch. In particular, by collecting the neighbor patches based on the dynamically computed reference distance from the reference patch, orthogonality of the noise in the collected patches may be maximized. This can guarantee an improved noise cancellation effect as a result of the processing in operation 108, particularly in the case of denoising, or can minimize the effect of noise (such as the introduction of artifacts) other applications in which operation 108 is applied.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
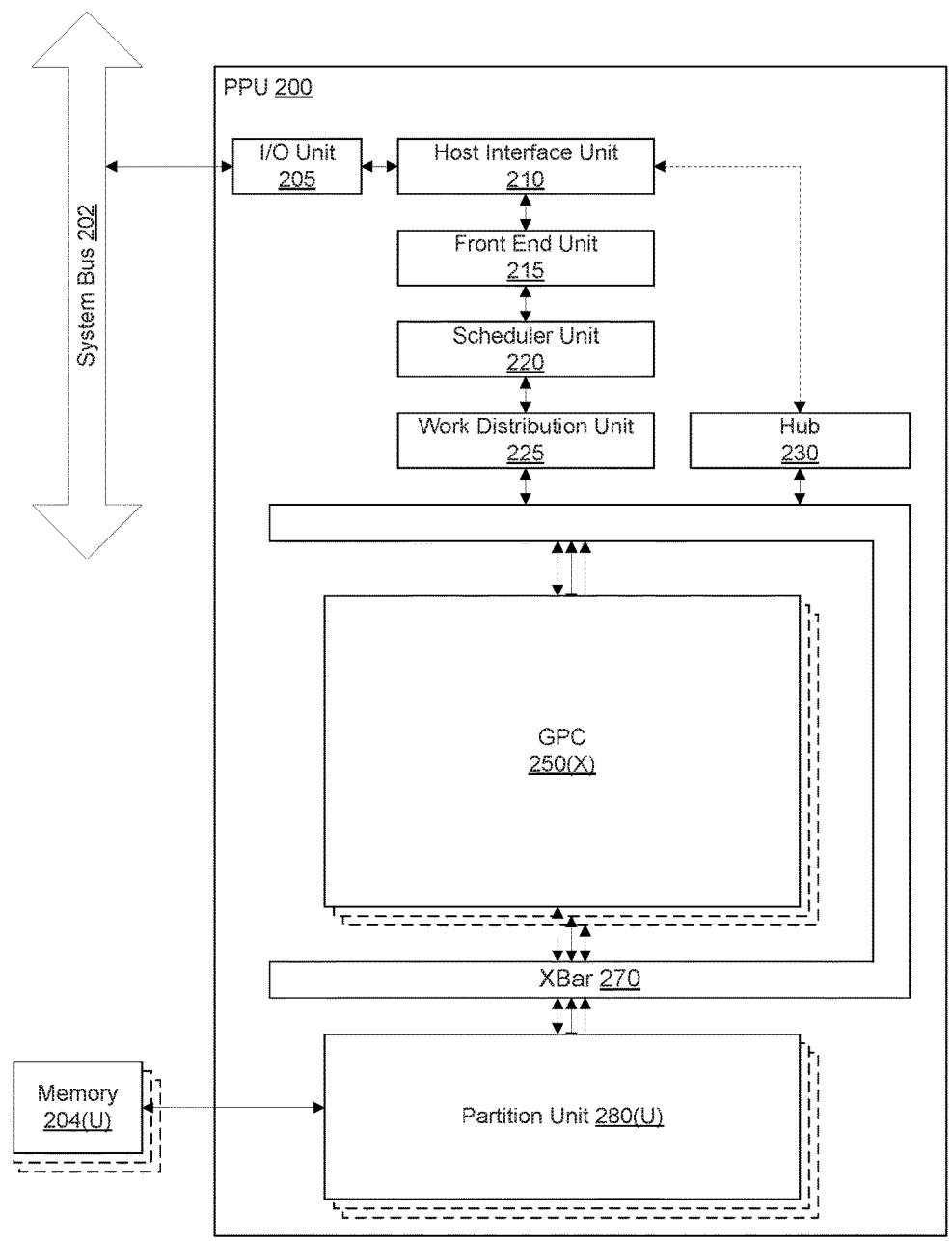
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
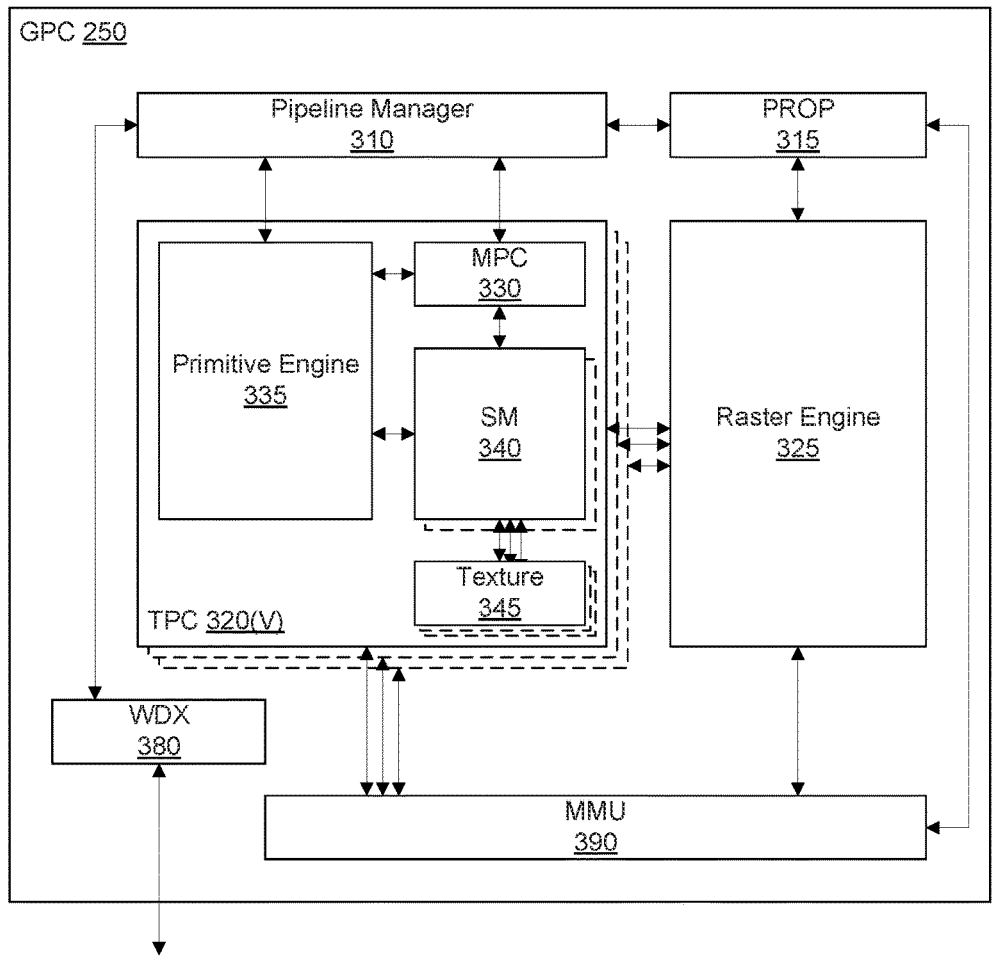
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the CPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a RIVED (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
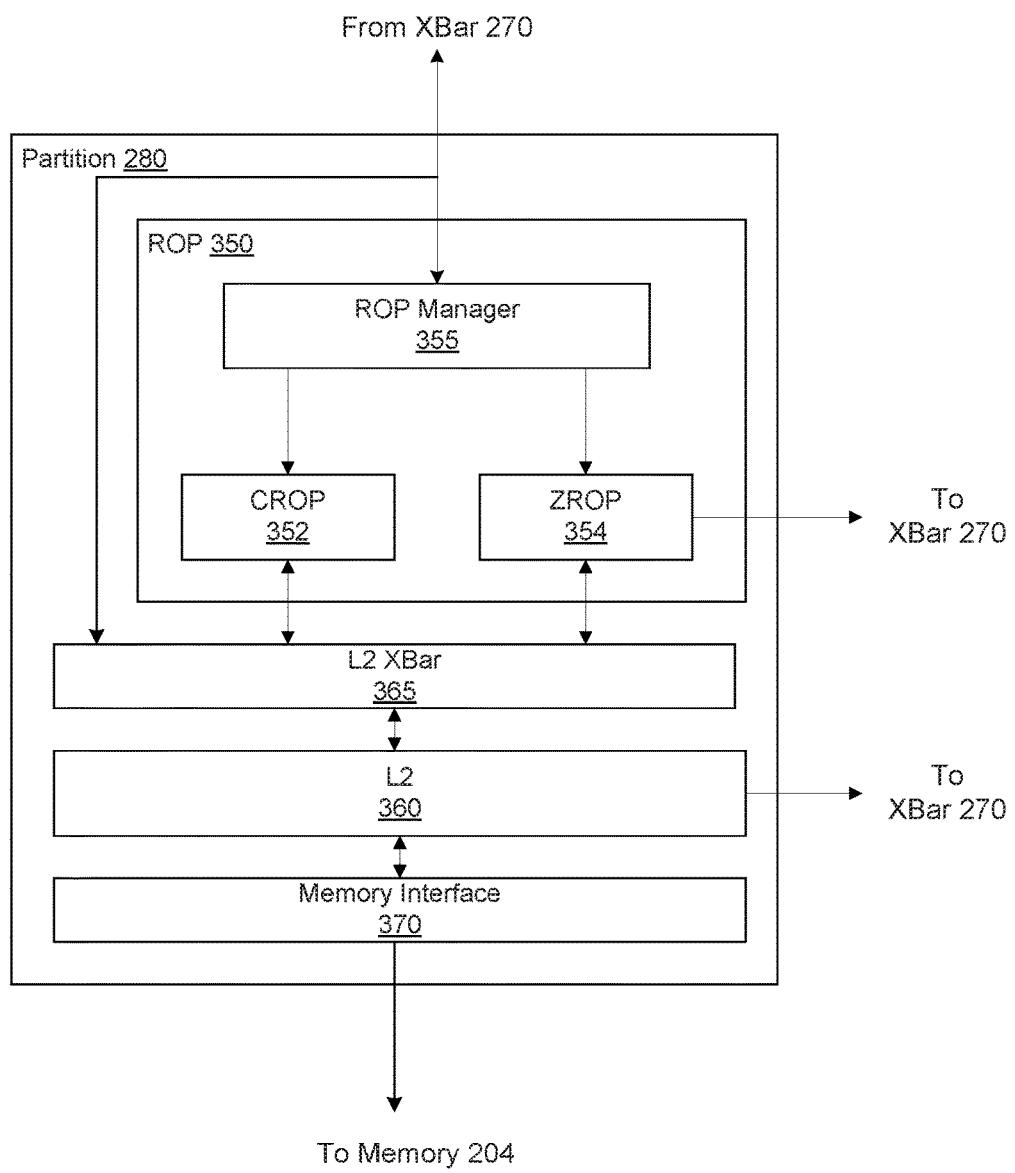
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
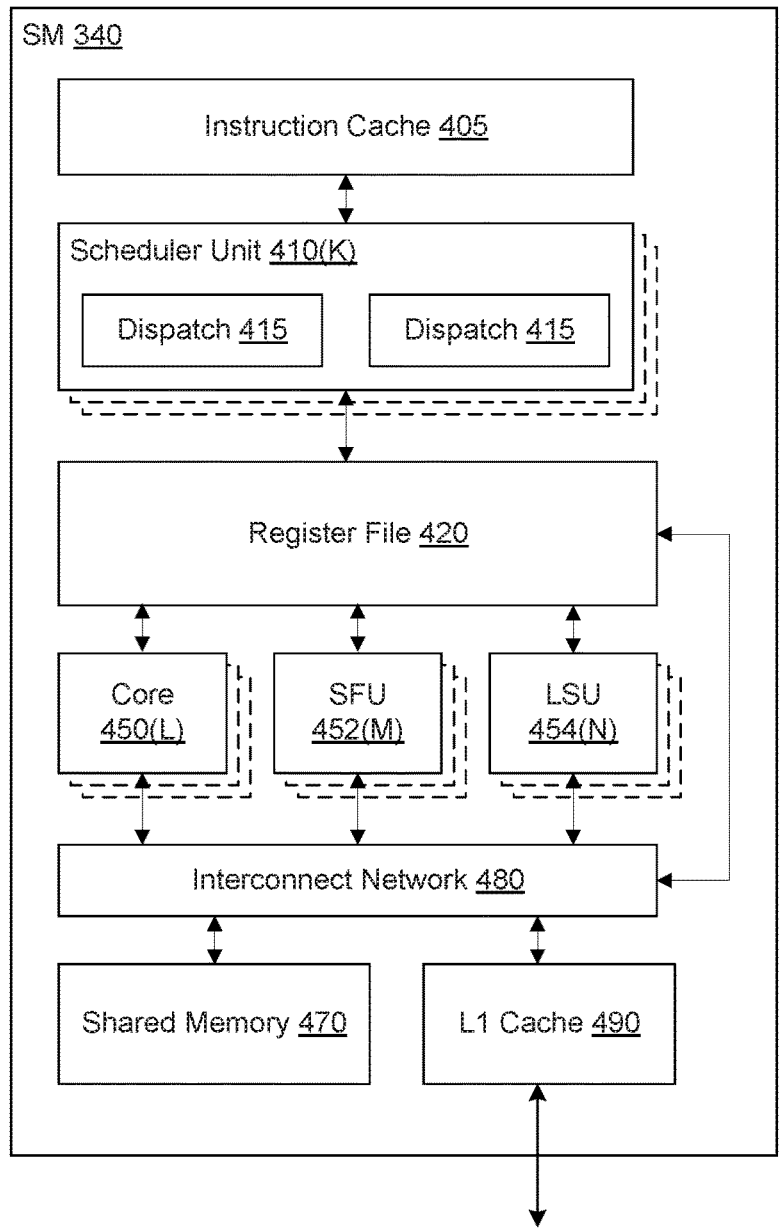
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included in a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
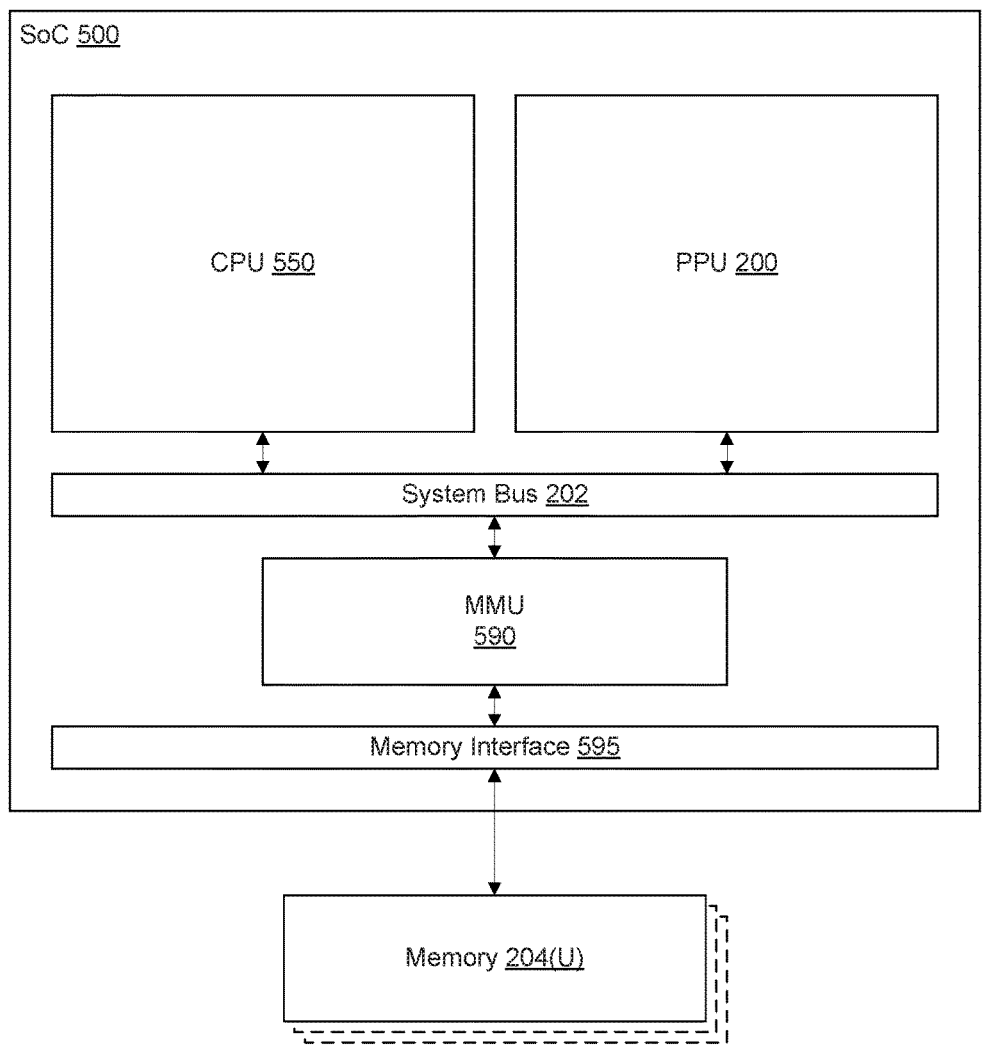
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
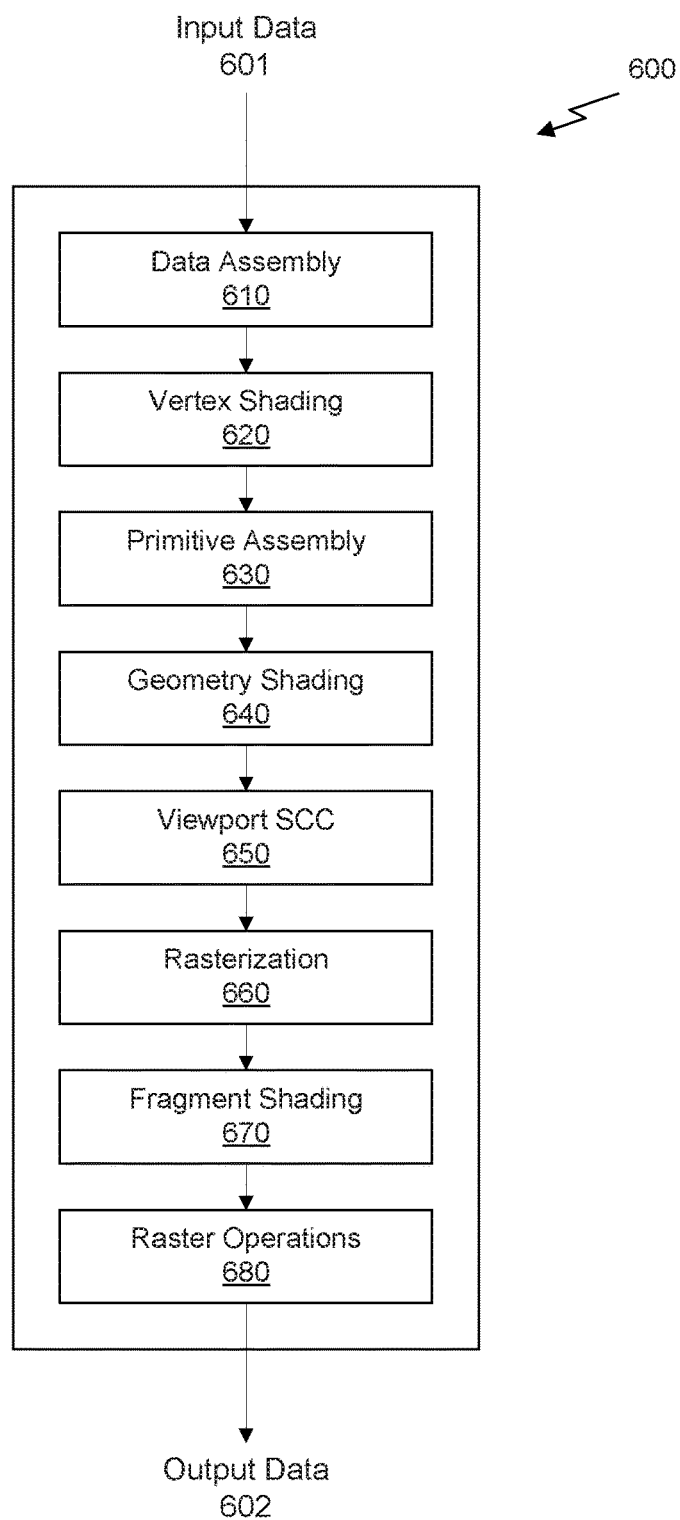
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Neighbor Patch Collection Scheme Using Dynamically Computed Distance

Figure 7A:
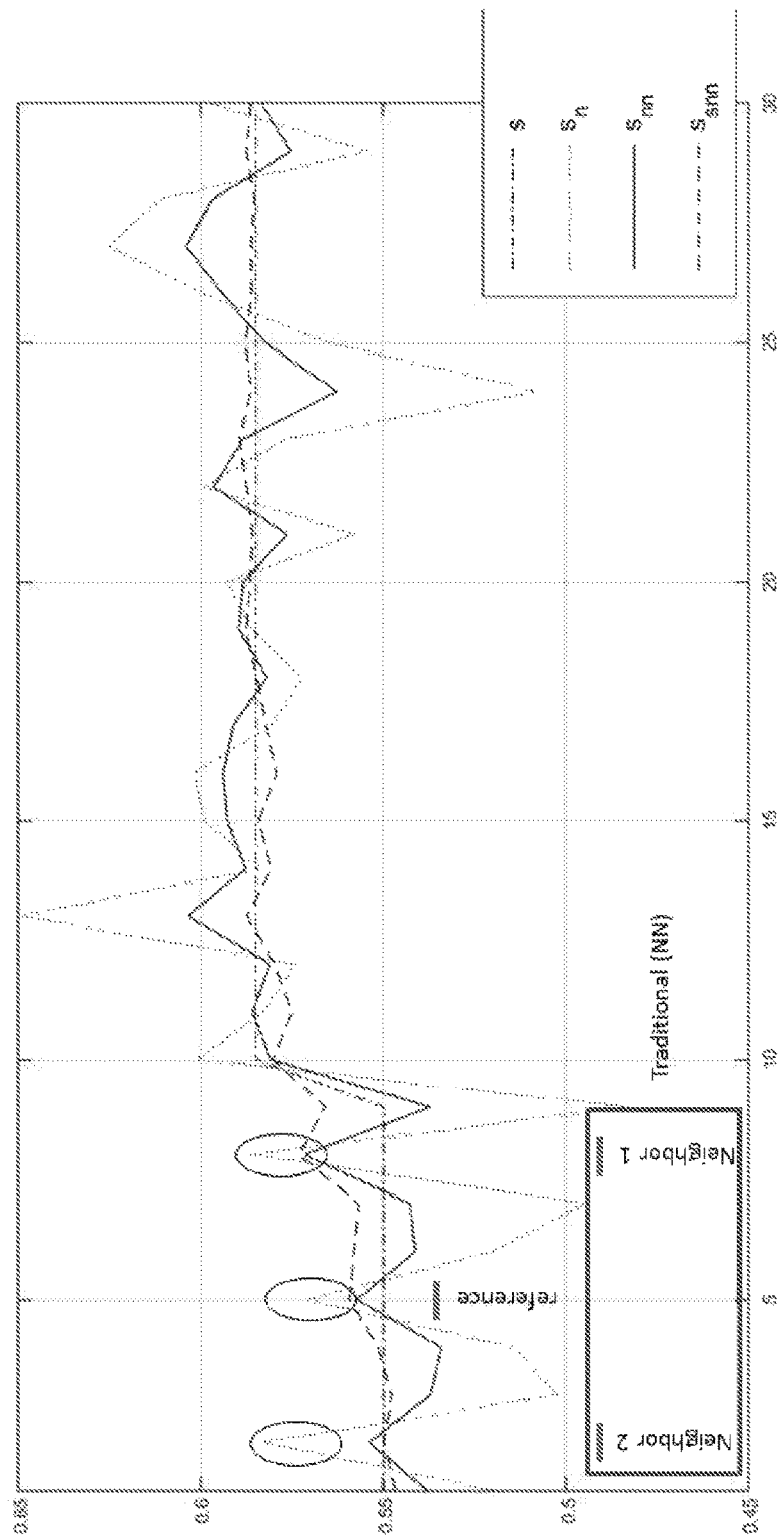
FIG. 7A illustrates a graph of a signal processed using nearest neighbors, in accordance with the prior art.

FIG. 7A illustrates a graph of a signal processed using nearest neighbors, in accordance with the prior art.

Figure 7B:
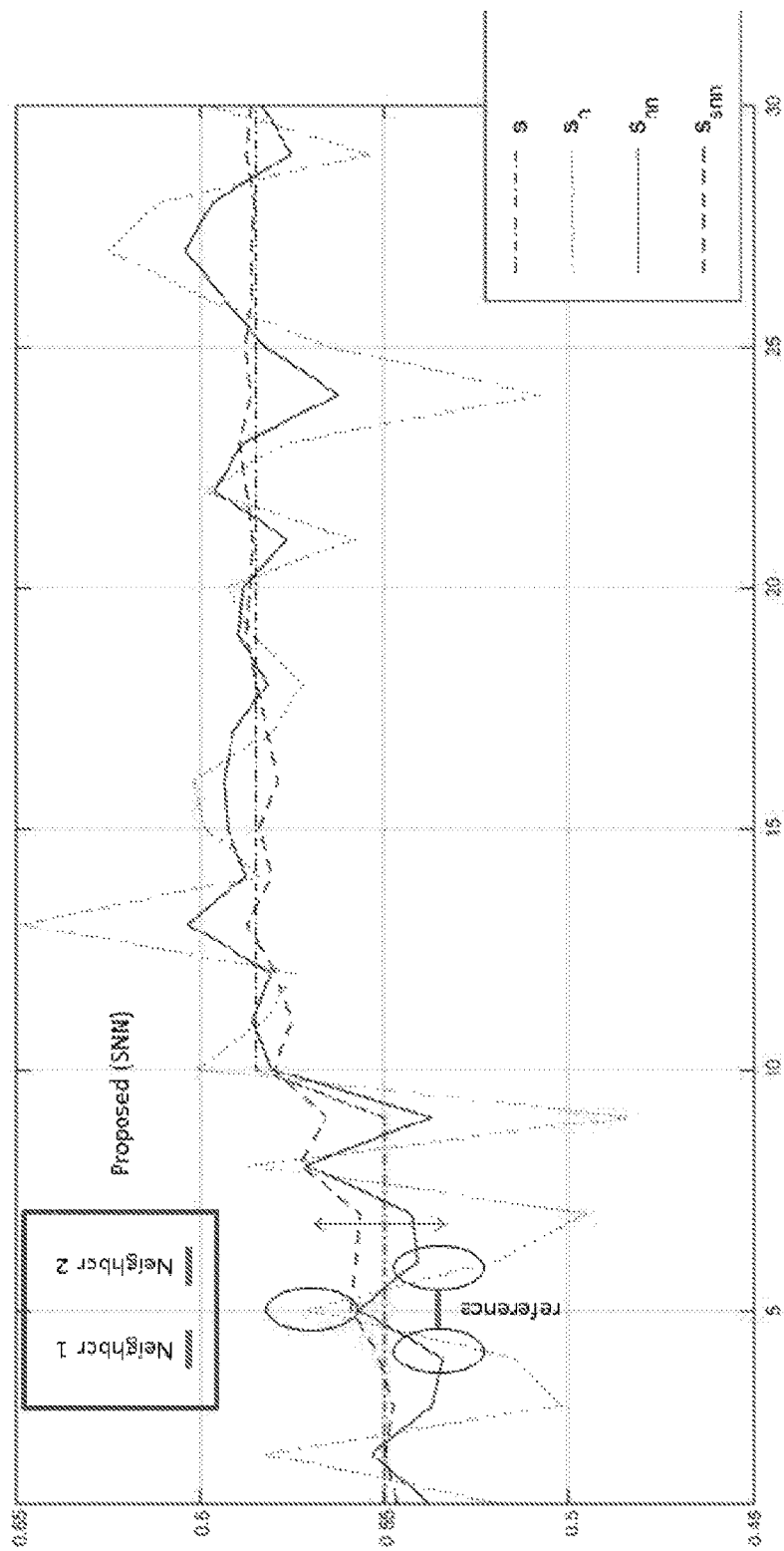
FIG. 7B illustrates a graph of the signal of FIG. 7A processed using neighbor patches selected based on a distance dynamically computed from a noise distribution of a reference patch, in accordance with one embodiment.

FIG. 7B illustrates a graph of the same noisy signal of FIG. 7A, but which is processed using neighbor patches selected based on a distance dynamically computed from a noise distribution of a reference patch, in accordance with one embodiment.

As shown, the reference patch in the noisy signal (s_n) has a peak. Matching with the traditional NN approach identifies neighbor patches with peaks, thus the peak is present in the processed (e.g. denoised) signal. Matching with the method described above in FIG. 1 identifies patches that are at the expected distance, providing a better estimate of the noise-free signal. It should be noted that the double arrowed line shown in FIG. 7B indicates the expected distance computed for the signal.

Figure 8:
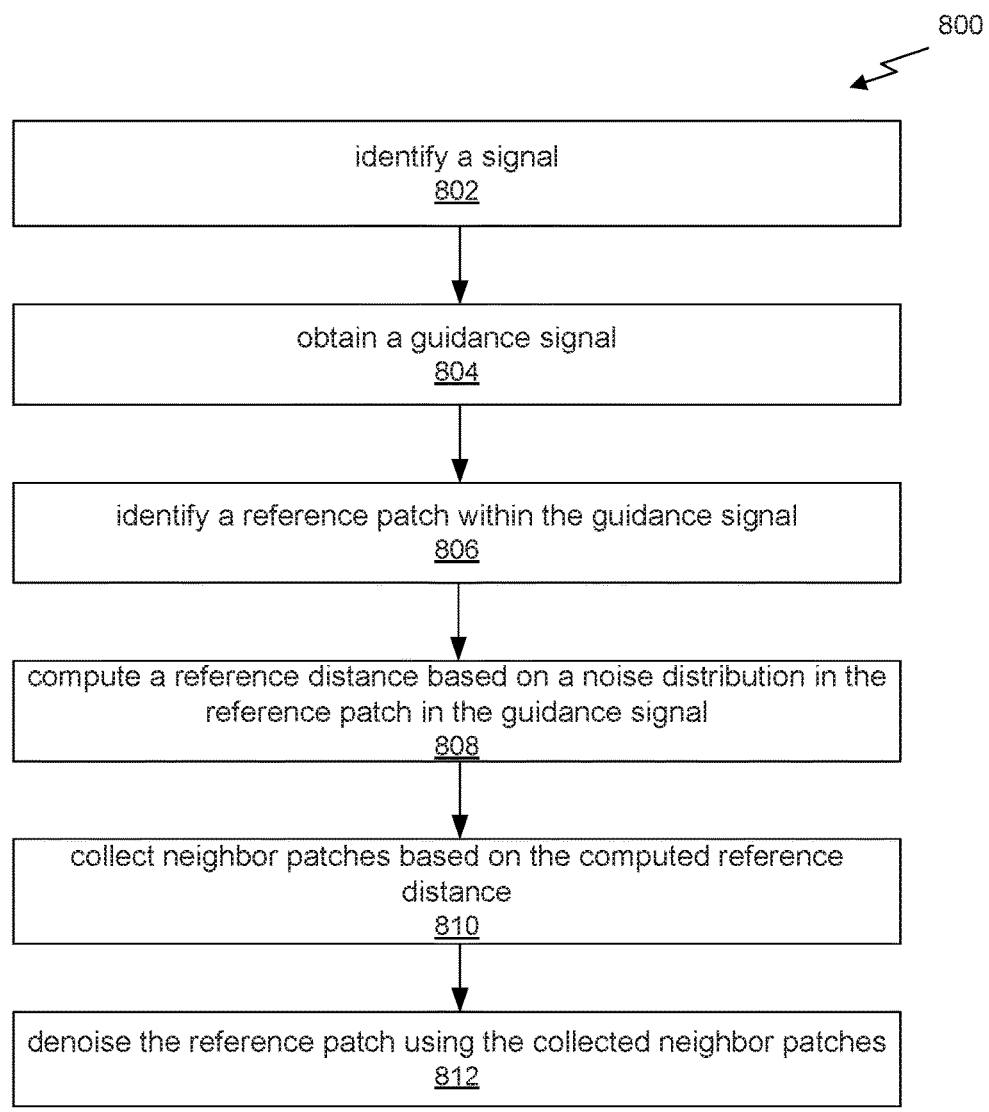
FIG. 8 illustrates a flowchart of a method for denoising a signal, in accordance with one embodiment.

FIG. 8 illustrates a flowchart of a method 800 for denoising a signal, in accordance with one embodiment. It should be noted that method 800 may be carried out in the context of any of the figures described above. Thus, the descriptions and definitions given above may equally apply to the present description.

As shown in operation 802, a signal is identified. The signal may be identified from memory for the purpose of processing the signal. In operation 804, a guidance signal is obtained. In one embodiment, the guidance signal may be pre-processed version of the signal identified in 802. Just by way of example, the signal may be demosaiced using any known demosaicing algorithm to generate the guidance signal. In this case, the pre-processing introduces noise in the guidance signal. In another embodiment, the guidance signal may be a second signal acquired with the same or a different acquisition procedure or sensor used to acquire the signal identified in operation 802.

As shown in operation 806, a reference patch within the guidance signal is identified, and in operation 808 a reference distance is computed based on a noise distribution in the reference patch in the guidance signal. In one embodiment, the reference distance may be computed as early as possible in the graphics pipeline (i.e. following the demosaicing within the pipeline). The reference distance may be an expected distance at which neighbor patches have an orthogonal noise to the reference patch.

Further, in operation 810 neighbor patches are collected based on the reference distance from the reference patch. A position of the neighbor patches may be determined from the guidance signal and the neighbor patches may be collected from the original signal identified in operation 802. In operation 812 those collected neighbor patches are used to denoise the reference patch (e.g. through NLM, etc.). Optionally, operation 812 may be performed following any other processing of the signal within the pipeline, such as color correcting, enhancing, etc. For example, operation 812 maybe performed at an end of the graphics pipeline. It should be noted that, the method 800 may be repeated for each patch in the signal, for denoising every patch in the signal, and thus denoising the entire signal itself.

Figure 9:
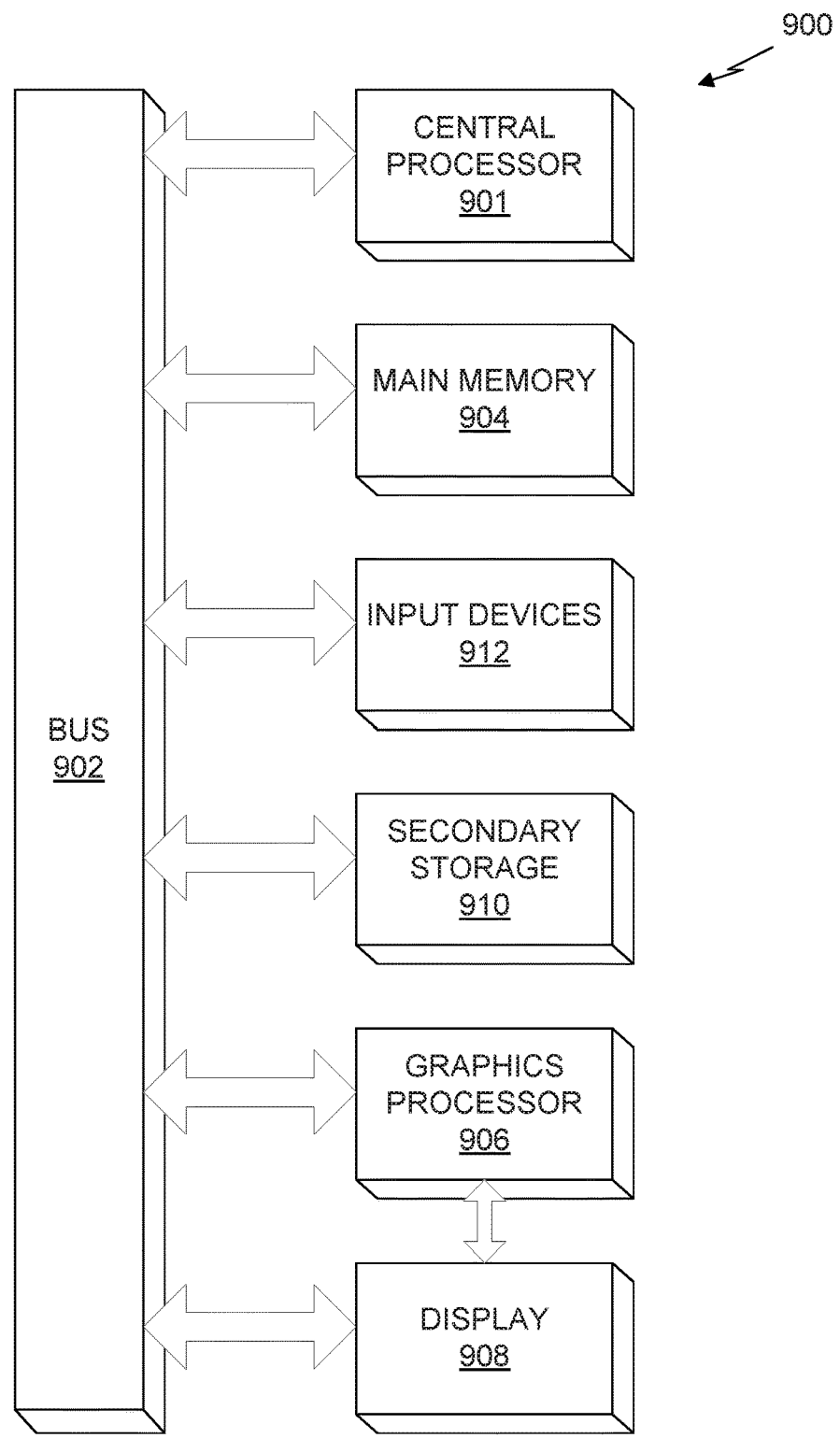
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing code executable by a processor to perform a method comprising:
    identifying a reference patch from a signal;
    determining a noise distribution in the reference patch;
    computing a reference distance based on the noise distribution in the reference patch;
    collecting from the signal neighbor patches closest to the computed reference distance from the reference patch, by
    (a) ordering possible neighbor patches to the reference patch by distance, and collecting a predefined number (N) of the ordered neighbor patches that are closest to the reference distance from the reference patch, or
    (b) determining a range for the reference distance, the range defined by a minimum distance from the reference patch that is a particular variance of the reference distance in a negative direction and a maximum distance from the reference patch that is the particular variance of the reference distance in a positive direction, and collecting all neighbor patches within the range;

processing the collected neighbor patches with the reference patch to generate one or more values for the reference patch.

2. The non-transitory computer readable medium of claim 1, wherein the signal is multi-dimensional and is an image.

3. The non-transitory computer readable medium of claim 2, wherein the image is a computer-generated graphic or a digital photograph.

4. The non-transitory computer readable medium of claim 1, wherein the signal is one dimensional (1D).

5. The non-transitory computer readable medium of claim 1, wherein the signal includes measurement noise or noise introduced from pre-processing of the signal.

6. The non-transitory computer readable medium of claim 1, wherein the signal is an image with noise introduced from pre-processing the image.

7. The non-transitory computer readable medium of claim 1, wherein the reference distance from the reference patch is computed based on a statistical distribution of noise for the signal.

8. The non-transitory computer readable medium of claim 1, wherein the reference distance from the reference patch is computed using a predefined algorithm.

9. The non-transitory computer readable medium of claim 8, wherein:
the reference distance is computed as $2\sigma^2 \cdot k \cdot N$ where the signal includes Gaussian noise,
wherein $\sigma^2$ is the variance of zero-mean, white Gaussian noise affecting the signal, and
where k is an offset parameter, and where N is the number of elements in the patch.

10. The non-transitory computer readable medium of claim 9, wherein different values of the offset parameter k are predefined for different applications of the processing of the collected neighbor patches.

11. The non-transitory computer readable medium of claim 10, wherein the applications include denoising and patch matching.

12. The non-transitory computer readable medium of claim 9, wherein a value of the offset parameter k is adaptively selected based on local properties of the reference patch, including whether the reference patch is close to an edge.

13. The non-transitory computer readable medium of claim 9, wherein $1 >= k > 0$.

14. The non-transitory computer readable medium of claim 1, wherein collecting neighbor patches closest to the computed reference distance from the reference patch includes:
(a) ordering possible neighbor patches to the reference patch by distance, and
collecting a predefined number (N) of the ordered neighbor patches that are closest to the reference distance from the reference patch.

15. The non-transitory computer readable medium of claim 1, wherein collecting neighbor patches closest to the computed reference distance from the reference patch includes:
(b) determining a range for the reference distance, the range defined by a minimum distance from the reference patch that is a particular variance of the reference distance in a negative direction and a maximum distance from the reference patch that is the particular variance of the reference distance in a positive direction, and
collecting all neighbor patches within the range.

16. The non-transitory computer readable medium of claim 1, wherein processing the collected neighbor patches includes applying non-local means to the reference patch using the collected neighbor patches, wherein the one or more values for the reference patch are generated as a mean of the collected neighbor patches.

17. The non-transitory computer readable medium of claim 1, wherein processing the collected neighbor patches includes applying patch matching to the reference patch using the collected neighbor patches.

18. The non-transitory computer readable medium of claim 1, wherein the signal is an original signal, wherein a position of each of the neighbor patches is determined from the original signal or from a guidance signal associated with the original signal, and wherein each of the neighbor patches is collected from the original signal.

19. The non-transitory computer readable medium of claim 18, wherein the guidance signal is obtained by one of:
pre-processing the original signal,
acquiring the guidance signal from a same source as the original signal,
acquiring the guidance signal from a different source than the original signal.

20. A method, comprising:
identifying a reference patch from a signal;
determining a noise distribution in the reference patch;
computing a reference distance based on the noise distribution in the reference patch;
collecting from the signal neighbor patches closest to the computed reference distance from the reference patch, by
(a) ordering possible neighbor patches to the reference patch by distance, and collecting a predefined number (N) of the ordered neighbor patches that are closest to the reference distance from the reference patch, or
(b) determining a range for the reference distance, the range defined by a minimum distance from the reference patch that is a particular variance of the reference distance in a negative direction and a maximum distance from the reference patch that is the particular variance of the reference distance in a positive direction, and collecting all neighbor patches within the range;
processing the collected neighbor patches with the reference patch to generate one or more values for the reference patch.

21. A system, comprising:
a computer memory for storing a signal; and
a computer processor for:
identifying a reference patch from the signal;
determining a noise distribution in the reference patch;
computing a reference distance based on the noise distribution in the reference patch;
collecting from the signal neighbor patches closest to the computed reference distance from the reference patch, by
(a) ordering possible neighbor patches to the reference patch by distance, and collecting a predefined number (N) of the ordered neighbor patches that are closest to the reference distance from the reference patch, or
(b) determining a range for the reference distance, the range defined by a minimum distance from the reference patch that is a particular variance of the reference distance in a negative direction and a maximum distance from the reference patch that is the particular variance of the reference distance in a positive direction, and collecting all neighbor patches within the range;

processing the collected neighbor patches with the reference patch to generate one or more values for the reference patch.

22. A non-transitory computer readable medium storing code executable by a processor to perform a method comprising:

identifying a reference patch from a signal;

determining a noise distribution in the reference patch;

computing a reference distance based on the noise distribution in the reference patch;

collecting from the signal neighbor patches closest to the computed reference distance from the reference patch;

processing the collected neighbor patches with the reference patch to generate one or more values for the reference patch;

wherein the reference distance is greater than zero, and collecting the neighbor patches closest to the computed reference distance from the reference patch avoids neighbor patches closest to the reference patch.

* * * * *